Oct. 8, 1968  J. J. KANE ET AL  3,404,907

WEDGE KEY

Filed Sept. 7, 1965  2 Sheets-Sheet 1

FIG. I

INVENTORS
JOHN E. WRIGHT
JOHN J. KANE
BY Charles L. Lovercheck
attorney

Oct. 8, 1968   J. J. KANE ET AL   3,404,907
WEDGE KEY
Filed Sept. 7, 1965   2 Sheets-Sheet 2

INVENTORS
JOHN E. WRIGHT
JOHN J. KANE

Charles L. Lovercheck
attorney

United States Patent Office 3,404,907
Patented Oct. 8, 1968

3,404,907
WEDGE KEY
John J. Kane, Erie, and John E. Wright, Fairview, Pa., assignors to Zurn Industries, Inc., Erie, Pa., a corporation of Pennsylvania
Filed Sept. 7, 1965, Ser. No. 485,423
1 Claim. (Cl. 287—52.05)

ABSTRACT OF THE DISCLOSURE

The spindle coupling disclosed herein is of general utility but finds its most common usage in rolling mills, wherein it is important that the effective driving connection be established between the roll and the driving spindle, while at the same time providing for easy and rapid roll changes. The roll disclosed insures proper driving connection between the driving spindle and the roll yet allows the roll to be easily removed. The cylindrical male coupling member has a recessed portion at a side thereof providing a surface extending longitudinally of the male coupling and a female coupling member having a socket receiving the male coupling. The female coupling member having a generally longitudinally extending surface disposed opposite said surface of the male coupling member when the male coupling member is inserted in the female coupling member. A space is provided between the male coupling and the female coupling tapering from a relatively small width to a greater width in a direction from the bottom of the socket of the female coupling member outwardly. A generally wedge-shaped key is disposed in the space between the coupling members to restrain them to rotate together. A spring is provided which acts directly on the wedge to urge it outwardly and a slot is provided in the female coupling member through which a stud extends and the stud is attached to the wedge.

---

This invention relates to couplings and, more particularly, to an improved key arrangement in a coupling for attaching a sleeve non-rotatably to a shaft.

The invention consists of the novel and peculiar construction of key arrangement in the particular arrangement and combination of parts and in various details of construction which constitutes an improvement on prior devices of this type and which will be more fully hereinafter set forth.

It is, accordingly, an object of the present invention to provide an improved key for non-rotatably holding a sleeve on a coupling.

Another object of the invention is to provide an improved combination shaft, key, and sleeve.

Still another object of the invention is to provide an improved key in combination with a gear coupling.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 1:
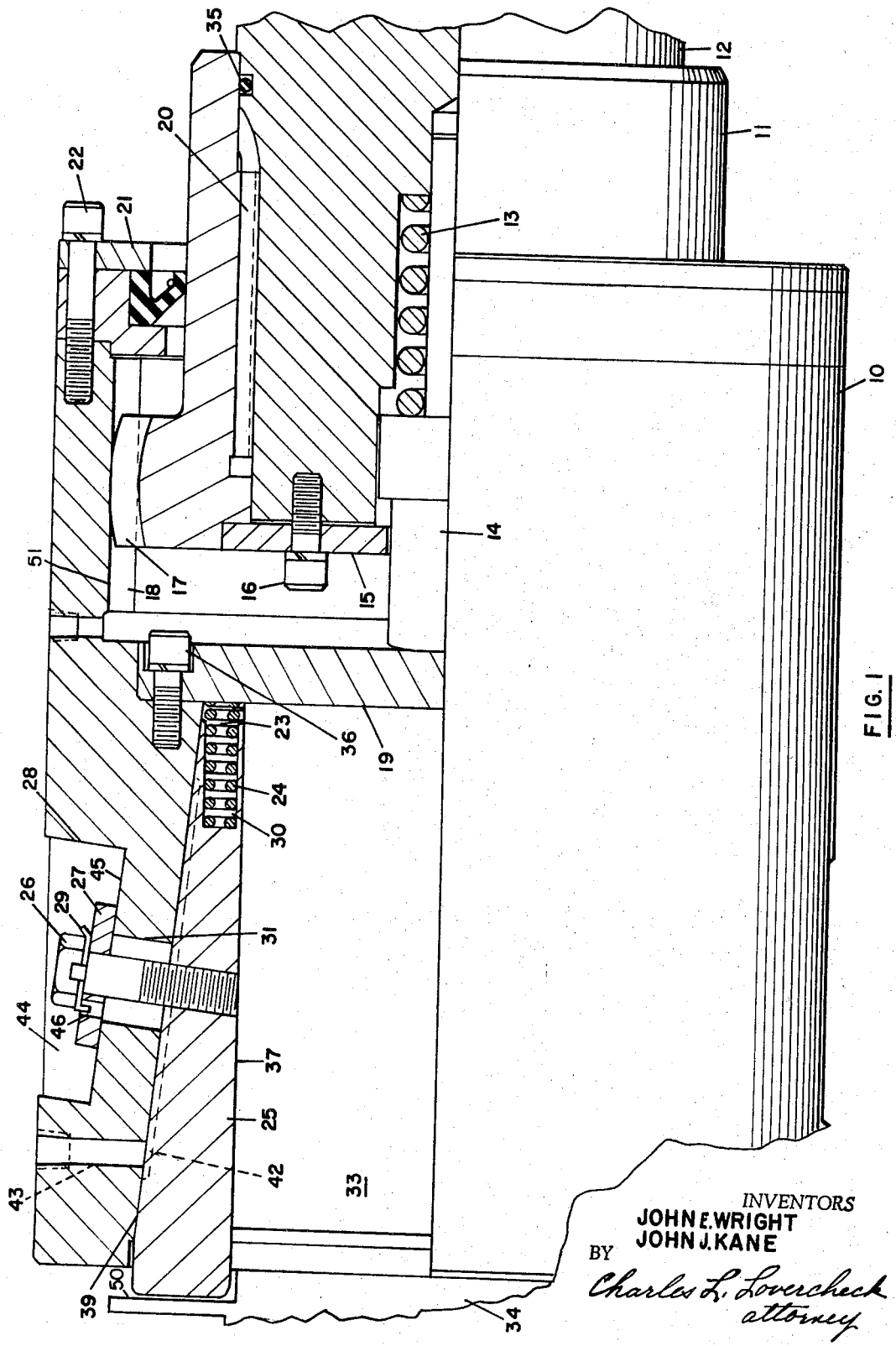
FIG. 1 is a partial view partly in cross section of a key and coupling in accordance with the invention.

Now with more particular reference to the drawings, the coupling shown includes the sleeve 10 which is generally in the form of a hollow cylinder and has a bore 33 in one end which may receive a shaft 34.

The sleeve is counterbored on its opposite end and the counterbore has internal teeth 18 which engage external teeth 17 on the hub 11. The hub 11 receives the shaft 12 which is non-rotatably secured thereto by means of a key 20 and a suitable keyway arrangement. The shaft has an external groove which receives an O-ring seal 35.

The shaft has a bore in its end which receives the thrust button 14 which is urged axially outwardly of the bore shaft 12 by the spring 13. The thrust button engages the thrust plate 19 which is fixed to the sleeve by means of studs 36. The thrust plate 19 is received in a counterbore 51 in the sleeve.

A sealing arrangement, which may be of a conventional type, is indicated at 21 which prevents leakage of lubricant from the space around the teeth 17 and 18 to the outside of the coupling. This sealing arrangement is held in place by means of studs 22. The thrust button 14 is held in place and limited in axial movement by means of a retainer 15 which is held to the shaft 12 by means of studs 16.

Figure 2:
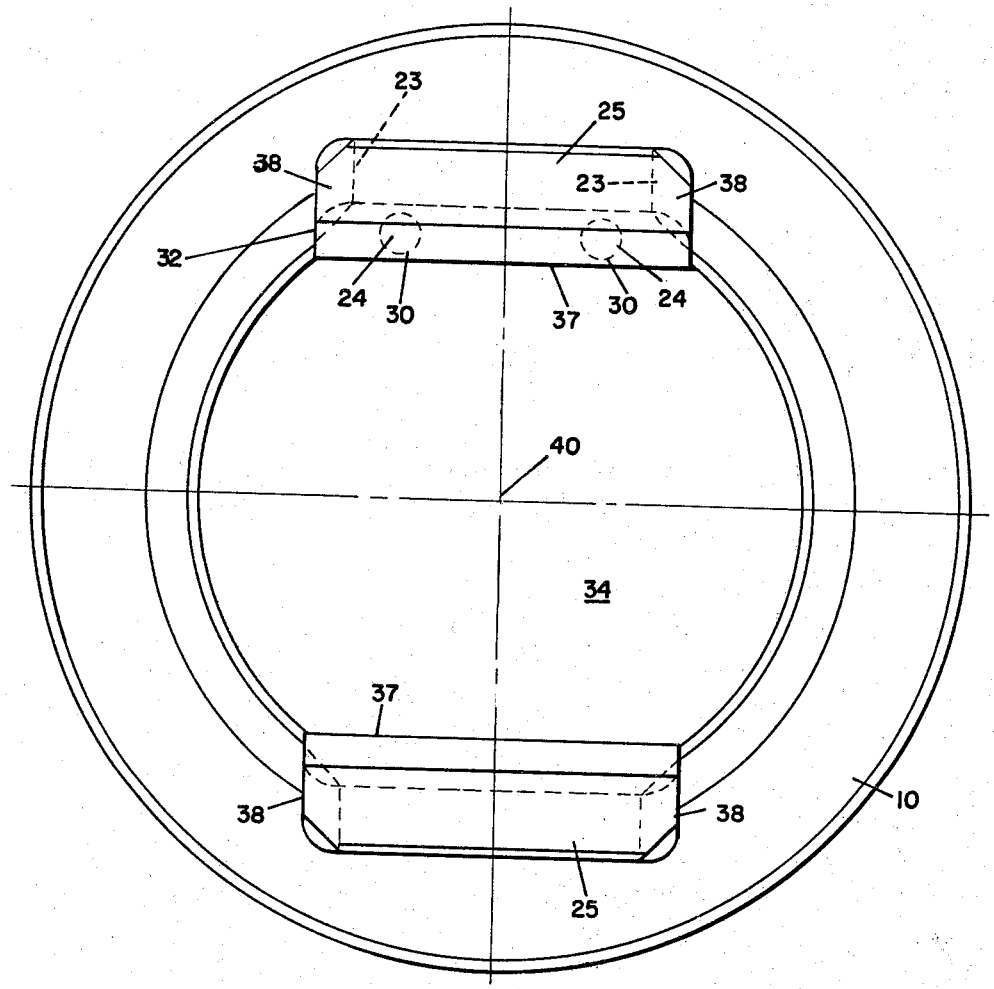
FIG. 2 is an end view of the sleeve and key shown in FIG. 1.

The key 25 is wedge shaped and has a flat under-surface 37 which rests against a corresponding flat surface on the shaft 34. The key has two flat sides 38 which are received in a suitable keyway in the sleeve 10 which has flat shoulders which engage the sides 38. The keyway has an inclined top surface 39 which inclines toward the teeth 18 and toward the center 40 of the shaft 34. The key has spaced holes at 30 which receive springs 24. The sides 38 of the key taper toward each other as in FIG. 2 and terminate at the inner end at 23.

The key has a slot 42 at its outer surface which receives a pin 43 which limits its outward movement when the studs 26 are removed. The studs 26 are threadably engaged in the key and the studs extend through slots 31 in the sleeve 10 and terminate in the groove 44. The washers 27 are supported on the bottom surface 45 of the groove 44 and the washers slide over the bottom surface 45 of the groove 44. A lock washer 29 is supported under the heads of the studs 26 and it is bent downwardly into the locking hole 46. It will be noted that the compression springs 24 urge the key outwardly in its tapered arrangement. Thus, when the shaft is removed, springs 24 will force the keys outward to provide maximum clearance to reinsert the shaft. As the shaft is reinserted upon its final movement into the bore 33, flange 50 will engage keys 25 and force them home in their keyways.

Figure 3:
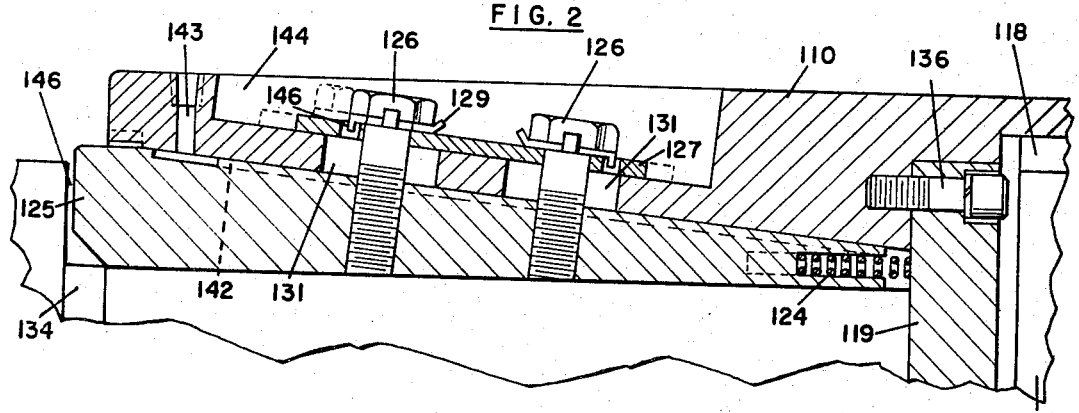
FIG. 3 is a partial cross sectional view of another embodiment of the invention.

In the emboidment of the invention shown in FIG. 3, a sleeve 110 has internal teeth 118 on a suitable hub 111. The sleeve 110 has a thrust plate 119 held to it by means of studs 136 as in the first embodiment. The sleeve receives a shaft 134 as in the first embodiment and has a tapered key 125 which is received in a keyway similiar to that shown in FIGS. 1 and 2. A groove 144 is formed in the outside of the sleeve and this groove receives two studs 126 which threadably engage the key 125 and extend through slots 131 in the sleeve. Lock washers 129 are placed under the heads of the studs and these lock washers have locking ears which extend into holes 146 in the washer 127.

A compression spring 124 is received in spaced holes in the end of the key and urges it outward. The limiting members 143 are received in holes in the key and they extend into slots 142 in the key. The roll neck of a steel mill installation will have a shoulder 146 on it which will engage the end of the key when the roll is finally bottomed in the sleeve. This will move the key to the position shown.

In operation, when the shaft 134 of the roll is removed, the keys 125 will be urged outward to their outermost position by the spring 124. Thus, they will have maximum clearance for the roll to be inserted. Then, as the roll is inserted, the shoulder 146 will engage the ends of the keys 125 and push them to the position shown. During this operation, the washer plate 127 will slide along the bottom of the groove 144 since this bottom surface is parallel to the outer surface of the key.

The foregoing specification sets forth the invention in its preferred practical forms but the structure shown is capable of modification within a range of equivalents without departing from the invention which is to be understood is broadly novel as is commensurate with the appended claims.

We claim:
1. In combination, a sleeve, a shaft, and key means to attach said sleeve to said shaft,
   said shaft being generally round and having a generally flat surface on one side thereof,
   said sleeve having a hole therein receiving said shaft,
   a keyway in said sleeve,
   said keyway having two generally flat sides and a bottom surface tapering from the outer end of said sleeve and toward the axial center line of said shaft,
   a wedge shaped key received in said keyway,
   said key having flat sides slidably engaging said sides of said keyway,
   said key having a flat bottom surface slidably engaging said generally flat surface on said shaft,
   said key having a top surface slidably engaging said bottom of said keyway,
   means engaging said key and limiting the sliding movement of said key,
   a blind hole in said key,
   a helical compression spring,
   said helical compression spring being disposed in said blind hole,
   one end of said helical spring engaging the bottom of said blind hole in said key, the other end of said spring engaging said sleeve,
   said sleeve having a grove therein,
   said means engaging said key comprises two studs spaced from each other along the axial centerline of said shaft, said studs extending through said groove into said key and threadably engaging said key,
   said studs having heads received in said groove overlying said sleeve and extending through said sleeve,
   said means comprises two spaced studs spaced from each other along the axial center line of said shaft, said studs extend through said groove into said key.

References Cited

UNITED STATES PATENTS

| | | | |
|---|---|---|---|
| 882,643 | 3/1908 | Lundgren | 287—52.05 |
| Re. 25,929 | 12/1965 | Luenberger | 287—52.05 |
| 3,222,884 | 12/1965 | Lyle | 287—52.05 |

CARL W. TOMLIN, *Primary Examiner.*

WAYNE L. SHEDD, *Assistant Examiner.*